(12) United States Patent
Nita

(10) Patent No.: US 9,509,494 B2
(45) Date of Patent: *Nov. 29, 2016

(54) COMPUTER-IMPLEMENTED SYSTEM AND METHOD FOR PROVIDING SECURE DATA PROCESSING IN A CLOUD USING DISCRETE HOMOMORPHIC ENCRYPTION

(71) Applicant: Newline Software, Inc., Redmond, WA (US)

(72) Inventor: Marius D. Nita, Bellevue, WA (US)

(73) Assignee: Newline Software, Inc., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/709,282

(22) Filed: May 11, 2015

(65) Prior Publication Data

US 2015/0244517 A1 Aug. 27, 2015

Related U.S. Application Data

(63) Continuation of application No. 13/831,904, filed on Mar. 15, 2013, now Pat. No. 9,031,229.

(60) Provisional application No. 61/615,835, filed on Mar. 26, 2012.

(51) Int. Cl.
*H04L 9/28* (2006.01)
*H04L 9/00* (2006.01)
(Continued)

(52) U.S. Cl.
CPC ............ *H04L 9/008* (2013.01); *H04L 9/0894* (2013.01); *H04L 63/0428* (2013.01); *H04L 9/28* (2013.01); *H04L 2209/24* (2013.01)

(58) Field of Classification Search
CPC ........... G06F 17/301; G06F 17/30194; G06F 21/60; H04L 63/0428; H04L 67/1097; H04L 9/008; H04L 9/0662; H04L 9/28
USPC ...................... 713/150, 168; 380/28–30, 237
See application file for complete search history.

(56) References Cited

U.S. PATENT DOCUMENTS 8,681,973 B2* 3/2014 Weinman ................ H04L 9/008
380/28
8,874,930 B2* 10/2014 Chase .................. G06F 21/6227
380/28

(Continued)

OTHER PUBLICATIONS

Wikipedia., "Homomorphic Encryption." Retrieved from Internet: URL:http://en.wikipedia.org/wiki/Homomorphic_encryption, [Cached on Feb. 10, 2012].

(Continued)

*Primary Examiner* — Nirav B Patel
(74) *Attorney, Agent, or Firm* — Leonid Kisselev; Patrick J. S. Inouye

(57) ABSTRACT

A computer-implemented system and method for providing secure data processing in a cloud using discrete homomorphic encryption is provided. Plaintext data items are homomorphically encrypted into queries, which are transmitted to a discrete homomorphic encryption server. From the server are received identifiers associated with the queries. The identifiers are transmitted to a computing server in a cloud-computing environment, where at least one of the identifiers is processed. The plaintext data items are encrypted into ciphertext data items and transmitted to a storage server in the environment requested to store the items in a storage. References for storage locations of the ciphertext data items are received and associated with identifiers for the queries encrypted from the same plaintext data item as the ciphertext data items at the locations. The ciphertext data item whose location is identified by the reference associated with the identifier in the processing result is retrieved and decrypted.

20 Claims, 7 Drawing Sheets

(51) Int. Cl.
*H04L 9/08* (2006.01)
*H04L 29/06* (2006.01)

(56) References Cited

U.S. PATENT DOCUMENTS

| | | | | |
|---|---|---|---|---|
| 8,925,075 | B2* | 12/2014 | Krendelev | H04L 9/008 380/28 |
| 9,183,407 | B2* | 11/2015 | Meijer | G06F 21/6227 |
| 2012/0278622 | A1* | 11/2012 | Lesavich | G06F 17/30864 713/168 |
| 2015/0295716 | A1* | 10/2015 | Liu | H04L 9/008 713/191 |

OTHER PUBLICATIONS

Rivest et al., "On Data Banks and Privacy Homomorphisms" In Foundations of Secure Computation, pp. 169-180, (1978).

Gentry., "Fully Homomorphic Encryption Using Ideal Lattices." In the 41st ACM Symposium on Theory of Computing. (STOC), (2009).

Schneier., "Schneier on Security, Homomorphic Encryption Breakthrough." Retrieved from Internet: URL:http://www.schneier.com/blog/archives/2009/07/homomorphic_enc.html, (Jul. 9, 2009).

Schneier., "Schneier on Security, Data at Rest vs. Data in Motion. Retrieved from Internet: URL:http://www.schneier.com/blog/archives/2010/06/data_at_rest_vs.html," (Jun. 30, 2010).

Wikipedia., "Record (Computer Science)." Retrieved from Internet: URL:http://en.wikipedia.org/wiki/Record_(computer_science), [Cached on Jan. 13, 2012].

Wikipedia., "Public-Key Cryptography" Retrieved from Internet: URL:http://en.wikipedia.org/wikiPublic_key_encryption, [Cached on Mar. 12, 2010].

Wikipedia., "Object Model" Retrieved from Internet: URL:http://en.wikipedia.org/wiki/Object_model, [Cached on Jan. 21, 2012].

Wikipedia., "AAA Protocol" Retrieved from Internet: URL:http://en.wikipedia.org/wiki/AAA_protocol, [Cached on Jan. 10, 2012].

Wikipedia., "Key Derivation Function" Retrieved from Internet: URL:http://en.wikipedia.org/wiki/Key_derivation_function, [Cached on Jan. 31, 2012].

Wikipedia., "Merkle—Damgård Construction" Retrieved from Internet: URL:http://en.wikipedia.org/wiki/Merkle%E2%80%93Damg%C3%A5rd_construction, [Cached on Jan. 27, 2012].

Wikipedia., "Birthday Paradox" Retrieved from Internet: URL:http://en.wikipedia.org/wiki/Birthday_paradox, [Cached on Dec. 14, 2011].

* cited by examiner

50

COMPUTER-IMPLEMENTED SYSTEM AND METHOD FOR PROVIDING SECURE DATA PROCESSING IN A CLOUD USING DISCRETE HOMOMORPHIC ENCRYPTION

CROSS-REFERENCE TO RELATED APPLICATION

This patent application is a continuation of commonly-assigned U.S. Pat. No. 9,031,229, issued on May 12, 2015, which claims priority under 35 U.S.C. §119(e) to U.S. Provisional Patent Application, Ser. No. 61/615,835, filed Mar. 26, 2012, the disclosures of which are incorporated by reference.

FIELD

This application relates in general homomorphic encryption, and, in particular, to a computer-implemented system and method for providing secure data processing in a cloud using discrete homomorphic encryption.

BACKGROUND

Homomorphic encryption is a form of encryption where a specific algebraic operation performed on the plaintext is equivalent to another (possibly different) algebraic operation performed on the ciphertext. Homomorphic encryption can be defined for both public-key (asymmetric) and private-key (symmetric) encryption. The original concept, called privacy homomorphism, was introduced by Rivest et al. in "On data banks and privacy homomorphisms," Foundations of Secure Computation, pages 169-180 (1978), shortly after the invention of RSA, the public-key encryption algorithm. While encryption used in a number of industries, some unresolved difficulties in use of homomorphic encryption remain. In particular, the immediate downside aspect of encrypted data is that the data cannot be further processed (e.g. added, multiplied, searched), thus severely limiting any post-encryption computing of the ciphertext, especially by an external processing entity such as a cloud computing service.

Processing of this encrypted data has long been a problem without a practical and secure solution. While homomorphic encryption schemes are being developed to address this situation, aside from a few homomorphic encryption schemes involving almost exclusively asymmetric-key algorithms, there are no practical symmetric-key encryption solutions for the cloud today.

Gentry in "Fully homomorphic encryption using ideal lattices," 41st ACM Symposium on Theory of Computing (STOC) (2009), used latticed-based cryptography to show the first fully homomorphic encryption (FHE) scheme for public-key cryptography. While this method creates an FHE scheme, the method remains impractical due to the complexity and large amount of computing involved. This complexity and the large amount of computing involved make the scheme's application, such as to a homomorphic search, not likely for the next 40 years, at least based on Moore's law. The scheme's applicability in the cloud storage and computing is also limited because the cloud uses prevalently private-key cryptography to store encrypted data.

Thus, existing technologies fail to provide an adequate solution to processing homomorphically-encrypted data in a cloud-computing environment, especially for data that is in motion. With the continual expansion of cloud computing, storing encrypted data using mostly symmetric-key encryption algorithms, having a practical homomorphic encryption method is critical in taking the cloud from a simple storage stage to having a real computing component that can process encrypted data and enable a series of cloud applications while retaining complete data privacy.

Therefore, there is a need for a way to provide data privacy in a cloud using homomorphic encryption while allowing the processing of such data.

SUMMARY

An application of homomorphic encryption, called discrete homomorphic encryption (DHE), allows querying, reading and writing encrypted data to and from any external data store without the data store ever decrypting the data.

The implementation of DHE can be used in conjunction with already established symmetric-key encryption algorithms, with intrinsic support for block ciphers. Data that is already encrypted with a key and stored in the cloud can also benefit from DHE. The use of DHE enables comparing two pieces of encrypted data and determine if they are the same, without decryption, thus enabling applications and services to find, retrieve and perform equality-based set and hierarchy operations on encrypted data located in the cloud without the cloud ever decrypting the data. Furthermore, using DHE can enable sharing of encrypted data between applications while having the encryption keys only on the client computing device and never in the cloud. The immediate practical implementation refers to applications in the cloud-computing environment where the external data source is a cloud web service. By using DHE, these applications can provide a series of cloud services (backup & restore, address books, database, collaboration & sharing) while having the data encrypted entirely.

A computer-implemented system and method for providing secure data processing in a cloud using discrete homomorphic encryption is provided. One or more plaintext data items are homomorphically encrypted on a client computing device into one or more homomorphic queries, each of the queries including a cryptographically safe representation of one of the encrypted data items; the queries are transmitted to at least one discrete homomorphic encryption (DHE) server and from the DHE server are received one or more identifiers, each of the identifiers associated with one of the queries; the received identifiers are transmitted to at least one computing server in a cloud-computing environment; the one or more of the plaintext data items are encrypted into ciphertext data items; the ciphertext data items are transmitted to at least one storage server in the cloud-computing environment and the storage server is requested to store the ciphertext data items in a storage in the cloud-computing environment; a reference for a location of each of the ciphertext data items in the storage is received from the storage server; an association is created between each of the received references and the identifier associated with the query that was encrypted from the same plaintext data item as the ciphertext data item the location of which is identified by that reference; the computing server is requested to process at least one of the transmitted identifiers and a result of the processing including at least one of the transmitted identifiers is received; the ciphertext data item whose location is identified by the reference associated with the at least one identifier in the result is retrieved; and the retrieved ciphertext data item is decrypted into the corresponding plaintext data item.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

The disclosed system and method define an application of the homomorphic encryption, called discrete homomorphic encryption (DHE) that enables applications and services to find, retrieve and perform equality-based set and hierarchy operations on encrypted data located in a cloud-computing environment without the cloud ever decrypting the data. Additionally, encrypted data can be shared across applications.

As discussed below, the disclosed system and method involve homomorphic encryption algorithm called cryptographically secure semantic reduction (CSSR). This algorithm creates cryptographically safe representations of data, called homomorphic queries that are answered by a service with a semantic-less identity (DHE Id), usually a number. This Id further enables a variety of equality-based set and hierarchy operations. These Ids are further used by cloud applications to replace all encrypted sensitive data that requires processing.

Figure 1:
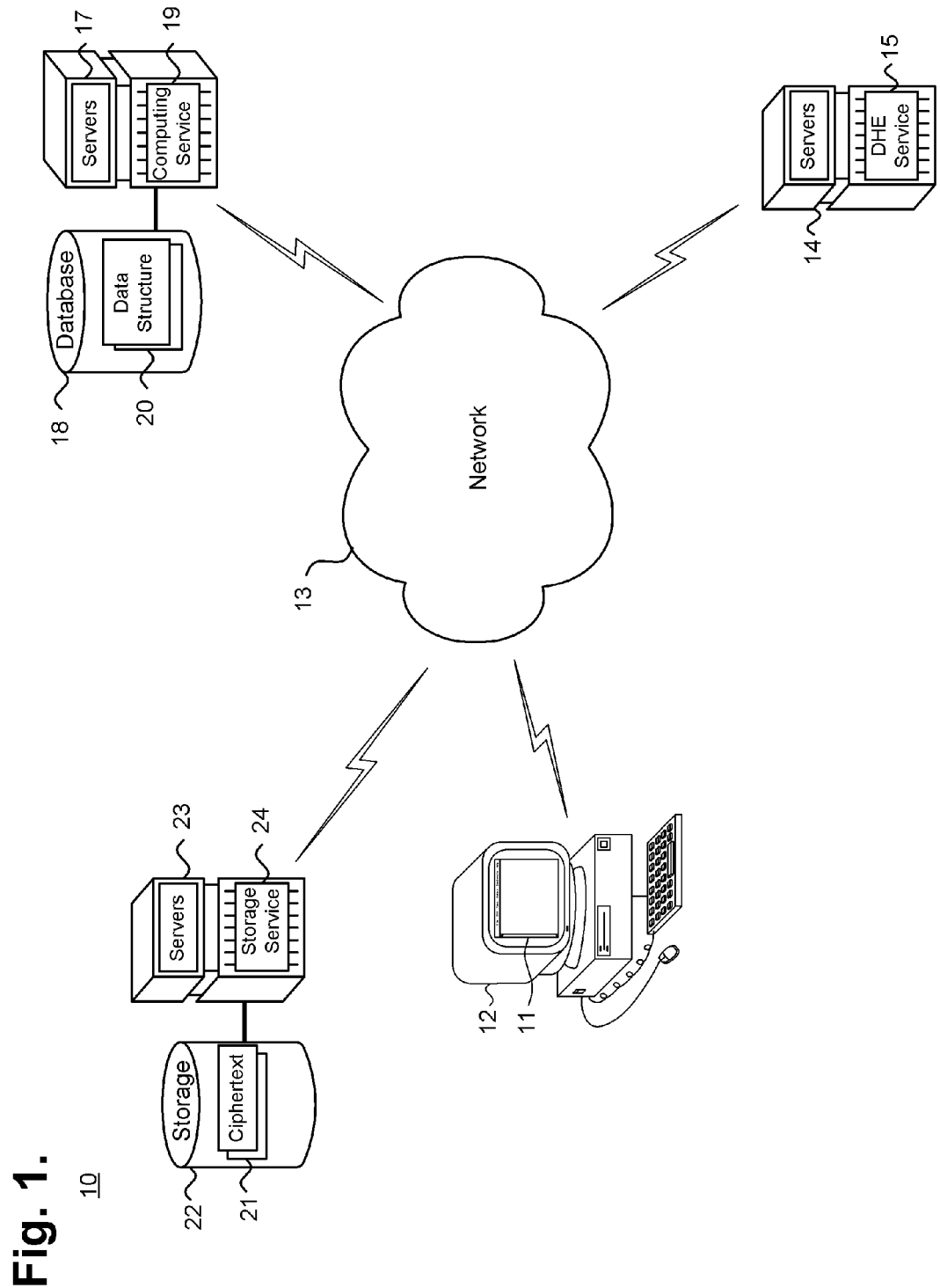
FIG. 1 is a block diagram showing a high-level structural overview of a system for providing data privacy in a cloud using discrete homomorphic encryption in accordance with one embodiment.

Structural Overview of the System for Providing Data Privacy Using Discrete Homomorphic Encryption FIG. 1 is a block diagram showing a high-level structural overview of a system 10 for providing data privacy in a cloud using discrete homomorphic encryption in accordance with one embodiment. The system 10 includes at least one software application 11 running on a client computing device 12. While shown as a desktop computer, the computing device 12 can include any other computing devices capable of running software, including mobile phones, tablets, and laptops. The computing device 12 includes components commonly-present in computing devices such as a central processing unit (CPU), random access memory (RAM), non-volatile secondary storage, such as a hard drive or CD ROM drive, network interfaces, and peripheral devices, including user interfacing means, such as a keyboard and display. The device 12 is configured to execute code of the application 11, which can be implemented as modules.

The application 11 is connected over a network 13, such as the Internet or a cellular network, to components in a cloud-computing environment (not shown), and transmits encrypted data items into the cloud-computing environment. While the described embodiment refers to the application 11 as a single application, multiple applications on the client computing device 12 can interact with the cloud-computing environment as described below. As described below with reference to FIGS. 2, 4, and 6, the application 11 performs the CSSR homomorphic encryption algorithm to encrypt plaintext data items (not shown) present on the computing device 12 into homomorphic queries, with each query being a cryptographically safe representation of one of the plaintext data items. The application 11 transmits the queries to the cloud-computing environment.

The cloud-computing environment includes one or more servers 14, called DHE servers 14 for the purposes of this application, which receive the queries and implement a DHE service 15 that generates an identifier (not shown), known as "Id" or "DHE Id" below, for each query. The DHE servers 14, which can be dedicated or shared servers, provide the generated Ids to the application, as further described below with reference to FIG. 2. The Ids completely lack any semantic relationship to the queries for which they were created.

The cloud-computing environment further includes one or more computing servers 17 connected to a database 18. These computing servers 17 implement a computing service 19 capable of performing equality-based operations on data in data structures 20 stored in the database 18. In one embodiment, the service 19 can be the Amazon Elastic Compute Cloud (EC2®) offered by Amazon.com Inc. of Seattle, Wash. or Windows Azure service offered by Microsoft Corporation of Redmond, Wash. The servers 17 can further substitute data in the data structures 20 with the Ids generated by the DHE service 15 when requested by the application 11.

The application 11 further encrypts plaintext data items into ciphertext data items 21, and transmits the ciphertext data items 21 to be stored in a cloud-computing storage 22. The storage 22, which in one embodiment can be the S3 storage maintained by Amazon.com Inc. of Seattle, Wash., is connected to one or more storage servers 23. The storage servers 23 implement a storage service 24, which receives the ciphertext data items 21 from the application 11, stores the ciphertext data items 21 in a location in the storage 22, and returns a reference (not shown) to the location of a stored ciphertext data item 21 to the application 11. As described below with reference to FIG. 8, the application 11 can associate a reference with an Id corresponding to the query generated from the same plaintext data item as the ciphertext data item whose location is identified by the reference, and to provide the association to the DHE service 15. The application 11 can also retrieve the reference associated with one of the Ids from the DHE service 15. The application 11 can further retrieve the ciphertext data item 21 stored at the location identified by the reference, and decrypt the retrieved ciphertext data items 21 into plaintext.

In the system 10 described above, the data and the keys are always encrypted while in transit or processed by the services 15, 19, or 24 while these services never have access to the encryption keys. As described below, the application 11 includes a DHE Client Application Programming Interface ("API"), as well as other APIs to the other services 19, 24, which are implemented on the client computing device 12.

Figure 2:
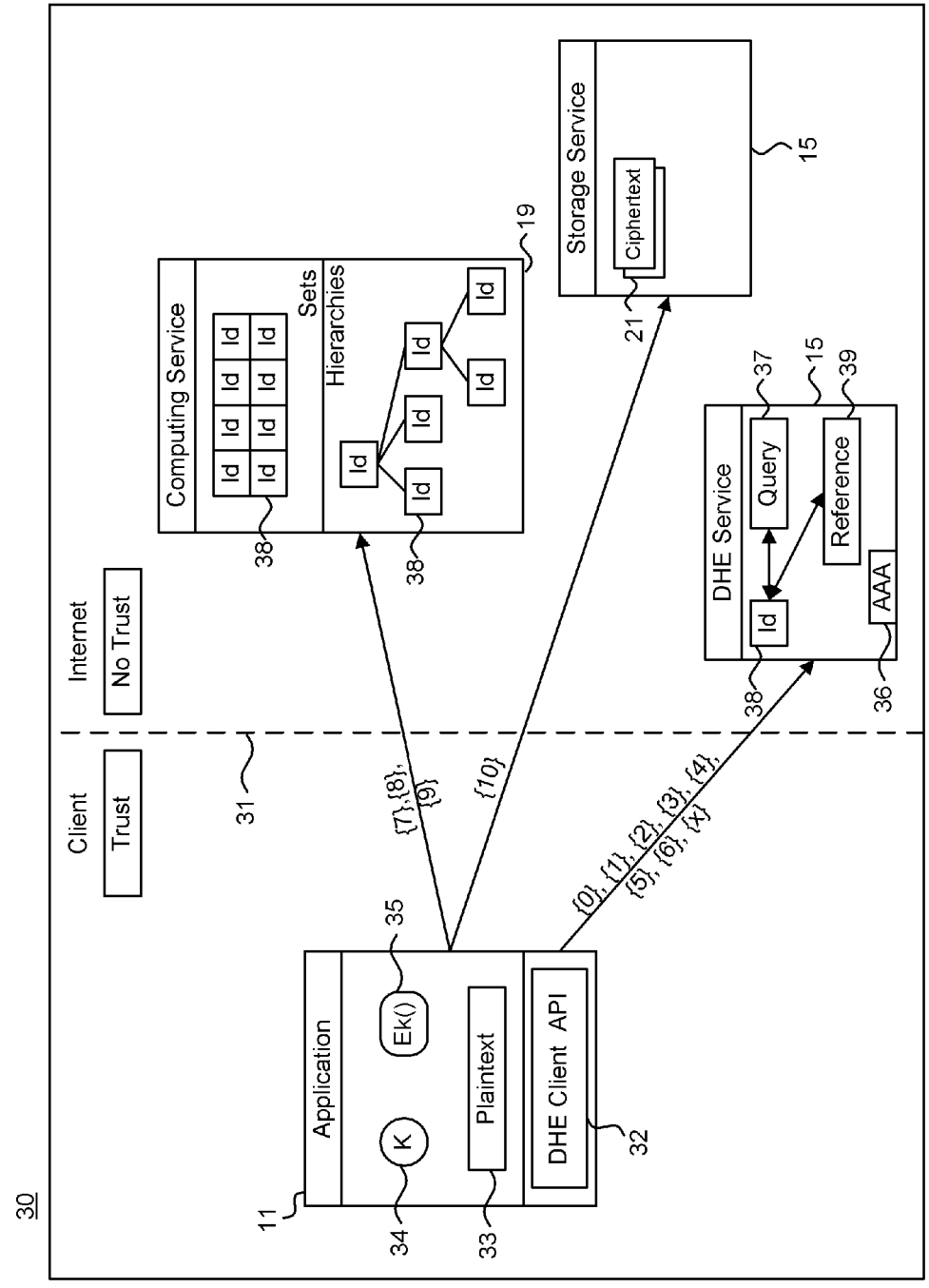
FIG. 2 is a block diagram showing a functional architecture of the system of FIG. 1 in accordance with one embodiment.

Functional Overview of the System for Providing Data Privacy Using Discrete Homomorphic Encryption The operations called by the application 11 at the client computing device 12 drive the functionality of the system 10. FIG. 2 is a block diagram showing a functional architecture of the system of FIG. 1 in accordance with one embodiment. The system 10 is separated by a trust/no-trust line 31. The trust/no-trust line 31 conceptually divides the system 10 into two realms or zones: the trusted zone and the non-trusted zone. In FIG. 2, operations {0}, {2}, {3}, {4}, {5}, {6}, {7}, {8}, {9}, and {10}, involve calling one of the services 15, 19, and 24, to request the services 15, 19, and 24 to perform at least a part of the operation.

In the trusted zone, data is available as plaintext 33 (unencrypted). This zone is usually a secure private client application space, not on the Internet, but connected to the Internet. Only the owner of the data has access to the data in both encrypted and unencrypted form through the trusted client application 11. In the non-trusted zone, data must be available as ciphertext 21 only (encrypted). This zone is the cloud-computing environment located on the Internet. The most important aspect of this zone is that the cloud-computing environment components never interact directly but only through the trusted client application 11.

Four entities interact in the system 10: the client application 11, the DHE service 15, the cloud computing service 19, and the cloud storage service 24. The application 11 includes the DHE Client API 32, as well as APIs to the other services (not shown). In one embodiment, the application 11 and the different services 11 have different ownership and are implemented by different entities, as described below with reference to Table 1. The ownership of implementation and operation (hosting) can belong to one of the following entities:

Customer: a user of the system, typically a company or user owning the data.
Cloud Provider: a provider of cloud services such as processing or storage.
DHE Provider: the provider of the DHE service 15.

TABLE 1

| Category | Implementation | Operation |
| --- | --- | --- |
| Client Application 11 | Customer | Customer |
| DHE Client API 32 at client | DHE Provider | Customer |
| DHE Service 15 | DHE Provider | DHE Provider |
| Object Model (sets, hierarchies) | Customer | Cloud Provider |
| Processing in computing service 19 | Customer | Cloud Provider |
| Storage service 24 | Cloud Provider | Cloud Provider |

Returning to FIG. 2, the application 11 is main driver of the system 10, orchestrating all of the system's 10 operations. The application has access to and uses at least the following entities: plaintext data 33, an encryption key (K) 34 and an encryption algorithm ($E_K$) 35. The plaintext data 33 needs to be encrypted, stored, and homomorphically processed in the cloud. When grouped together in data structures (e.g. sets, hierarchies), these form an object model. The encryption key (K) 34 is used to encrypt the plaintext data 33. The encryption algorithm ($E_K$) 35 encrypts the plaintext data 33 with the encryption key (K) 34.

Operations Performed by DHE Client API

The DHE Client API 32 is the client-side API of the DHE service 15 and is responsible for following operations:

Identity and access: Operation {0} is an operation that ensures that all calls to the DHE service 15 are authenticated, authorized and audited (AAA protocol 36). A user name, which can be an e-mail address, and a hashed password are provided to the DHE service 15 that returns a user id enclosed securely in a security token (not shown). This function means that all secure calls to the service 15 must be accompanied by the security token. This requirement is assumed to be the case for all calls below. The implementation of the AAA protocol 36 is orthogonal to the DHE Client API.

{0} Security Token (User)=AAA(email, password)

Initialization: Initialization ensures that the CSSR algorithm is properly initialized with the encryption key K 34 and encryption algorithm $E_K$ 35. If an encryption key is not available, a keyphrase, provided by the user or obtained from another source, can be used to generate the encryption key K 34. The operation {1} stores a portion of the internal state of the CSRR and associates a public key with the user when sharing-mode is used, as further described below with reference to FIG. 4. In one embodiment, the operation {1} transmits the encrypted CSSR algorithm to the DHE servers 14 for storage in the cloud-computing environment, as further described with reference to FIG. 4.

CSSR=Init(K, $E_K$) or
CSSR=Init (keyphrase, $E_K$)
{1} Init (CSSR)

Query generation: using the CSSR algorithm a cryptographically safe representation of data called homomorphic query 37 is created.

Query=CSSR(Plaintext)

Unique key generation: using the CSSR algorithm a unique encryption key ($K_H$) is generated, when the sharing-mode is used.

$K_H$=CSSR(Plaintext)

Query: In operation {2}, the DHE service 15 is queried using the homomorphic query and it responds with an Id 38, which lacks any semantic relationship to the query 37. This Id 38 can be a sequential, random or global number based purely on the private internal state of the service DHE Service 15. Other Ids 38 are possible.

{2} Id=Query

Set reference: Operation {3} associates an Uri (absolute or partial) with the Id. The Uri is a complete or partial reference 39 to the location of the encrypted data with the storage service 22.

{3} Set(Id, Uri)

Get reference: Operation {4} retrieves the Uri associated with the Id 38. This function is also called a reverse query.

{4} Uri=Get(Id)

Get info: Operation {5} retrieves all information and statistics associated with a specific DHE Id 38.

{5} Info=Info(Id)

Unique key sharing: Operation {6} enables sharing of the unique encryption key ($K_H$) between two users ($U_1$, $U_2$). The superscript notation in the command below refers to operation at user ($U_1$) or ($U_2$). The CSSR uses public-key encryption with the key-pair of ($K_P/K_V$) where the ($K_P$) is the public key and ($K_V$) is the private key.

{6} Share=CSSR$^1$($K^1_H$, $K^2_P$)
$K^1_H$=CSSR$^2$(Share, $K^2_V$)

Other services: Operation {x} provides support for extra services such as signup, account management, key grouping, billing, expiration, deletion, status and troubleshooting.

Operations Performed by Computing and Storage Service APIs

The application 11 further includes a computing service API (not shown) and the storage service API (not shown). The computing service API makes application-specific calls to the application's 11 own object model stored in the cloud computing service 19. These calls are always implemented by the direct consumer of the DHE service 15, making the following operations possible:

Substitution: Operation {7} ensures that all encrypted sensitive data items that requires processing in the computing service 19 is replaced with Ids 38 produced by the Operation {2} call for the data items. In a further embodiment, the operation can create new data structures and insert the identifiers into the new data structures.

{7} Id=Substitution(CSSR, Plaintext)

Figure 3:
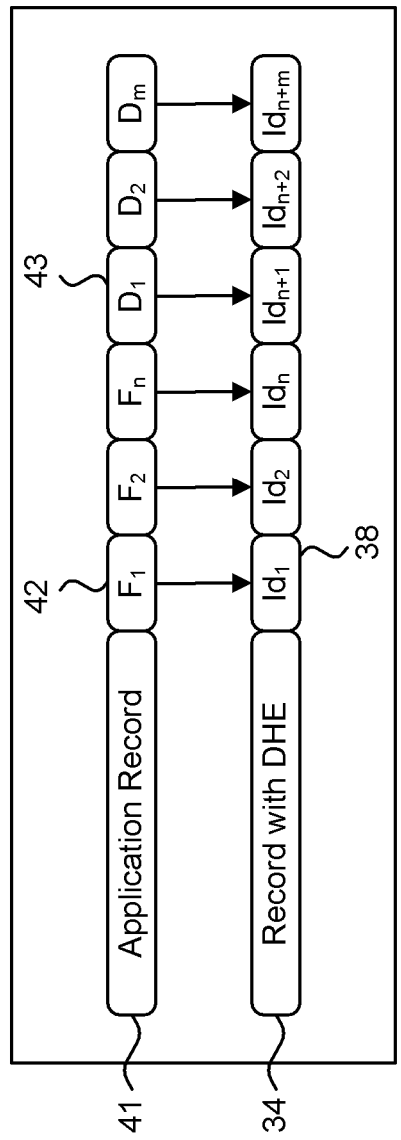
FIG. 3 is a block diagram showing populating a data record with Ids in accordance with one embodiment.

The operations {2} and {7} allow the client-side application 11 to substitute the fields in a data structure 20 with the corresponding Ids 38, as further described with reference to FIG. 3. Then the application 11 can find the data structure by secure queries by the DHE Ids 38 instead of the plaintext of its fields. When a data structure is retrieved from the computing service 19 and is available at the application 11, using operation {4} the Uri for each DHE Id 38 is retrieved; then the encrypted data is retrieved from the storage service 24 and decrypted locally, thus making the data structure available in the plaintext format to the application 11.

Equality-based operations: calls made to the object model exposed by the computing service 19, using the discrete homomorphic operations enabled by the Ids 38:

{8} Set operations: query, enumerate, union, intersection, difference, subset and count {9} Hierarchy operations: enumerate, traverse, and count Operations {8} and {9} are possible because the service 19 can find data organized in the data structures 20 by comparing and matching (an equality test) Ids 38 and then returning data structures (sets, hierarchies) 20 for these Ids.

Encrypt/Decrypt: encrypting of the plaintext 33 using the key (K) 34, an initialization vector described below with reference to FIG. 4, and encryption algorithm ($E_K$) 35. The corresponding decryption algorithm is $D_K$ (not shown) is used to decrypt ciphertext 21 into plaintext. If sharing-mode is used the encryption key used is ($K_H$).

Ciphertext=$E_K$(Plaintext, [K| $K_H$, IV])
Plaintext=$D_K$(Ciphertext, [K| $K_H$])

Read/Write: storing and retrieving of the ciphertext 21 to and from the storage 22 accessible to the storage service 24. The location of the ciphertext in the service 24 is used as the reference 39 for the DHE Client API 32 when associating the reference 39 with the DHE Id 38.

{10} Reference=Write(Ciphertext)
Ciphertext=Read(Reference)

The DHE, Computing, and Storage Services

As described above, three other entities interact in the system 10 in addition to the client application: the DHE service 15, the cloud computing service 19, and the cloud storage service 24.

The DHE service 15 is the server-side complement of the client-side DHE Client API 32, servicing the API's requests. The service's 15 critical responsibility and feature is the ability to answers the Query( ), operation {2}, calls with the Ids 38 in constant time, which in one implementation can be of O(1) complexity. The Id 38 can be a sequential, random or global number based purely on the private internal state of the DHE service 15, and thus have no semantic relationship to the client application (A) state. The operations for this service are grouped under {1-6} in FIG. 2.

The computing service 19 includes and exposes the application object model, as hosted in the database 18. The operations for this service are grouped under {7-9} in FIG. 2. The DHE Client API 32 never calls into this service 19 directly.

This storage service 24 stores the ciphertext data 21 into the storage 22, returning a reference (Uri) 39 that is associated with an Id 38. The operations for this service are grouped under {10} in the above diagram. The DHE Client API 32 never calls into this service 24 directly.

Example of Substituting Data Structures with Ids

As described above, the computing service 19 substitutes data structures 20 in the database with the identifiers 38 under the control of the application API. FIG. 3 is a block diagram showing substituting of data of in data in a record 41 with Ids 38 in accordance with one embodiment.

Client applications consume data that is stored in various data stores in the cloud. This data is usually organized in and accessed by various data structures 20, the simplest of them being a record 41, which is a row in a database table.

The application record 41 is typical of what is stored in the database 18 accessible to the computing service 19. The record 41 has the searchable fields 42 ($F_1 \ldots F_n$) and the data fields ($D_1 \ldots D_m$) 43. The searchable fields (F) 42 are usually indexed to be searchable, while the data fields (D) 43 may or may not be searchable depending of their size and data format. Examples of these records 42 are: customer/account information, file/directory metadata, order details etc.

The client-side application 11, substitutes the fields (F) and (D) with their corresponding Ids. Then the application 11 can find the record 41 by secure queries by the Ids 38 instead of the plaintext of the fields. Basically, each query for $Id_1$ to $Id_{n+m}$ can return the application record 41.

CSSR Algorithm

As described above, the CSSR algorithm creates cryptographically safe representations of data, called homomorphic queries (Q) that are answered by a service with a sematic-less identifiers. The algorithm is based on a 3-phase polynomial-time transformation that is designed to gradually reduce the semantics of data until completely eliminated. The critical requirement of the algorithm is to ensure all of its internal operations are performed while maintaining a minimum of λ-bit security level.

Figure 4:
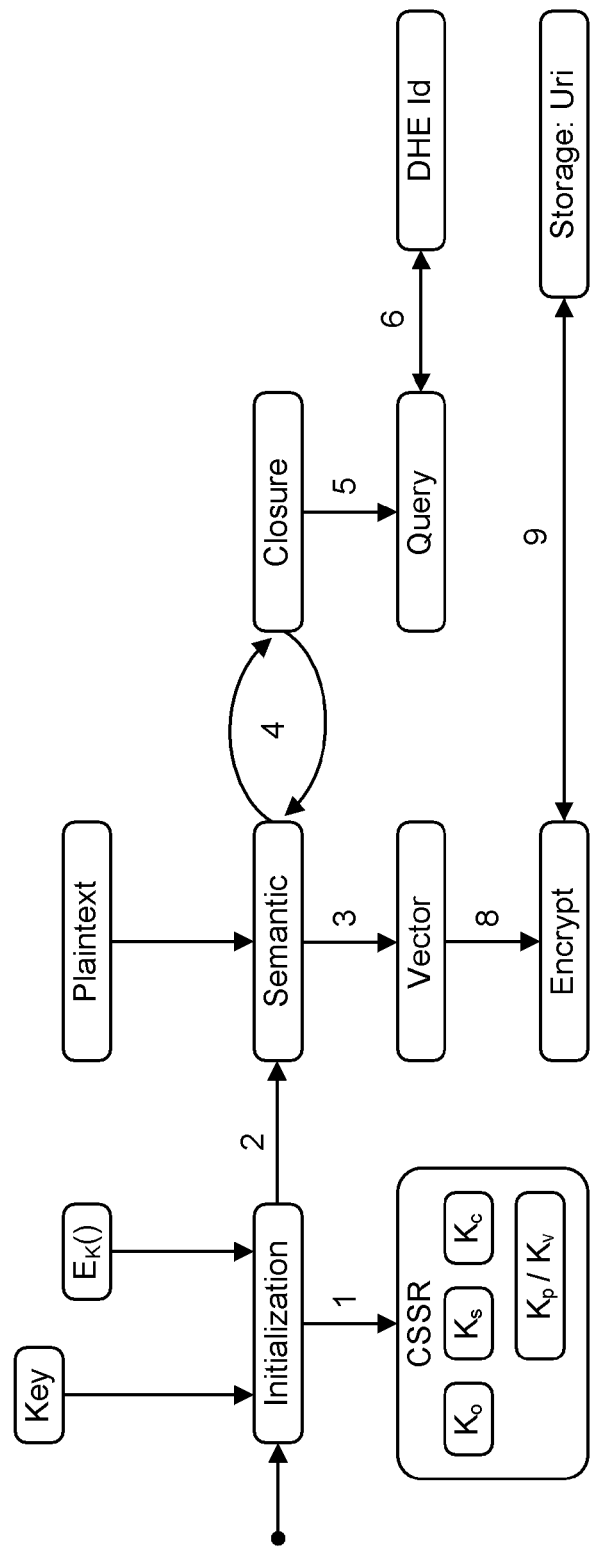
FIG. 4 is a flow diagram illustrating a performance of the Cryptographically Secure Semantic Reduction Algorithm in accordance with one embodiment.

FIG. 4 is a flow diagram illustrating a performance 40 of the CSSR algorithm in accordance with one embodiment. The algorithm includes three phases described below: initialization phase, semantic phase, and a closure phase.

Initialization Phase

During the initialization phase, the DHE Client API ensures that the CSSR algorithm is properly initialized with the encryption key (K) and encryption algorithm ($E_K$). If an encryption key is not available, a keyphrase can be used to generate the encryption key. The size of the key depends on the lambda security level.

{1} CSSR=Init(K, $E_K$) or
CSSR=Init(keyphrase, $E_K$)

The initialization creates the internal state (stream of bytes) needed for the algorithm plus additional keys using a secure key derivation algorithm:

$K_O$—the key that encrypts the algorithm state itself, hence used only once;

$K_S$—the semantic key used in operation {3} described below;

$K_C$—the closure key used in operation {4} described below;

$K_P/K_V$—a public-private key pair used in the sharing mode;

The internal state is encrypted with the key ($K_O$) in order to be persisted locally or with the DHE service for later re-creation or recovery. The public key ($K_P$) is stored with the DHE service and is associated with a user account (U).

Semantic Phase

Using a cryptographically secure one-way compression function ($F_S$) with the key ($K_S$) the plaintext on the client computing device is transformed into a vector (V). Using a one-way compression function ($F_V$) the vector (V) is transformed into the initialization vector (IV) later used for the encryption of the plaintext, as described with reference to FIG. 2.

{3} Vector=CSSR($F_S$, $K_S$, Plaintext)

{8} IV=CSSR ($F_V$, Vector)

The function ($F_S$) can be any secure Merkle-Damgård construction and thus must operate at a 2λ-bit security level due to collision caused by the birthday paradox. An example of acceptable algorithm is the HMAC-SHA256. The function ($F_V$) can also be a Merkle-Damgård construction. Other suitable algorithms can be used.

The transition at operation {2} from the initialization phase to semantic phase is one-way. The operation {8} is also one-way.

Closure Phase

Using a length preserving encryption algorithm ($E_C$) with the key ($K_C$) the vector (V) is transformed into the query (Q). An example of acceptable algorithm is the AES algorithm in FFX or BPS modes.

{5} Query=$E_C$($K_C$, Vector)

The transition {4} from the Semantic to Closure is reversible.

The client application using the DHE Client API can query {6} the DHE service for the Id or store and retrieve {9} the encrypted data from the storage service.

Sharing Mode

As mentioned above, the client application can also share data with DHE service by running the CSSR algorithm in the sharing-mode. In this mode the plaintext is encrypted with a unique key ($K_H$) that is derived by a one-way operation from the encryption key ($E_K$) and the vector (V), described above with reference to FIG. 3. Then a system user ($U_1$) can give access to another user ($U_2$) to specific DHE Ids.

The user ($U_2$) retrieves the encrypted data for these DHE Ids via operations {4} and {10} described with reference to FIG. 2, and the associated unique encryption keys ($K_H$) encrypted with the user ($U_2$) public key ($K_P$) from the DHE service. The user ($U_2$) can decrypt these keys with the private key ($P_V$), thus recovering the keys ($K_H$) and finally decrypting the ciphertext associated with each DHE Id. During this process the data or the keys were always encrypted while in transit or processed by the DHE service, computing service, or the storage service.

Method for Providing Data Privacy Using Discrete Homomorphic Encryption

Figure 5:
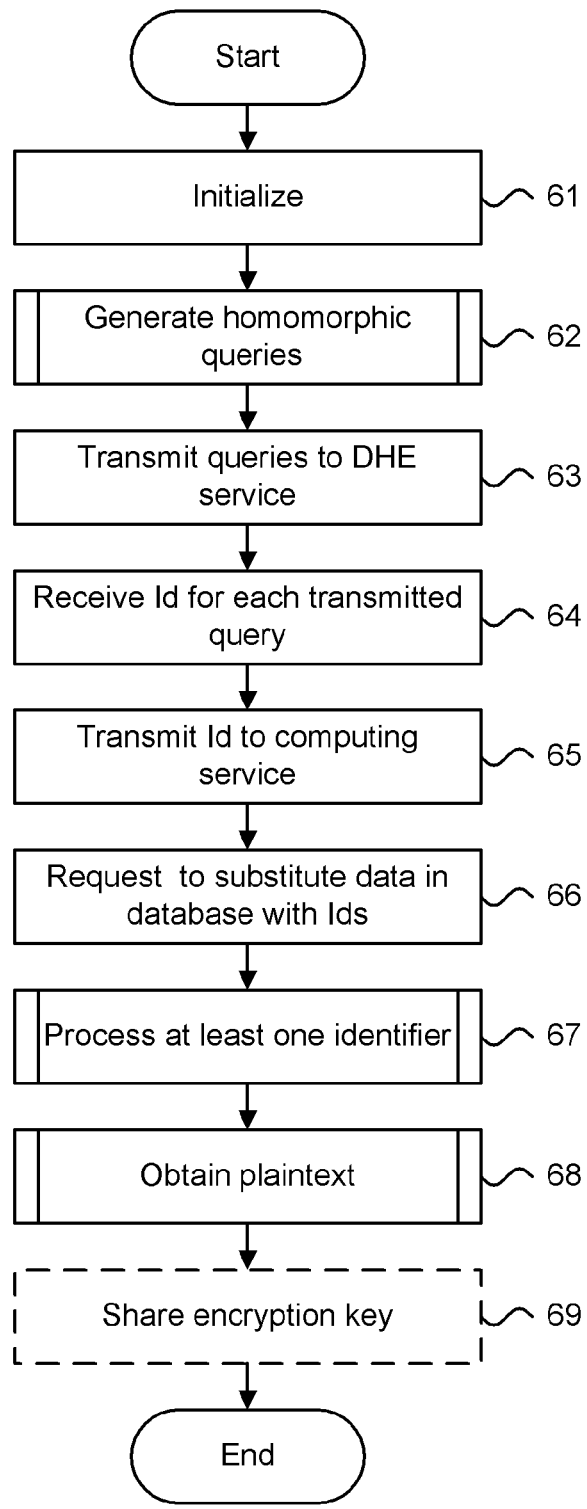
FIG. 5 is a flow diagram illustrating a method for providing data privacy in a cloud using discrete homomorphic encryption in accordance with one embodiment.

The simplicity of how DHE allows equality-based operations on encrypted data located in the cloud is also a powerful foundation that enables applications built on a DHE service to deliver very interesting scenarios of processing encrypted data with 100% privacy. FIG. 5 is a flow diagram illustrating a method 60 for providing data privacy in a cloud using discrete homomorphic encryption in accordance with one embodiment.

Initially, the DHE Client API performs an initialization step (step 61), as described above in reference to FIGS. 2 and 4, creating an internal state and obtaining the keys necessary for performance of the CSSR algorithm. Once the initialization (step 61) is complete, the DHE Client API generates homomorphic queries from plaintext data items maintained at a client computing device (step 62), as further described with reference to FIG. 6. The homomorphic queries are transmitted to the DHE service (step 62), which generates an Id for each query, and transmits the Id to the application at the client computing device, which receives the Ids (step 64). The Id for a query lacks a semantic relationship to that query.

Upon receiving the Ids, the client application transmits the Ids to the computing service (step 65) and requests the computing service to substitute data in data structures in the database accessible to the computing service with the Ids (step 66). Subsequently, the application processes at least one of the Ids using the computing service, as further described with reference to FIG. 7 (step 67). The application can then obtain the plaintext data item from which was generated the query corresponding to an Id delivered from the computing service as a result of the processing in step 61 (step 68), as further described with reference to FIG. 8. Optionally, if the CSSR algorithm is used in sharing mode, the client application can provide to the DHE service a public encryption key that can be used to obtain plaintext corresponding to a query identified by a specific Id, and requesting the DHE service to provide the key to a computing device of a user different than the user of client application, as described above with reference to FIGS. 2 and 4 (step 69), terminating the method 50.

Figure 6:
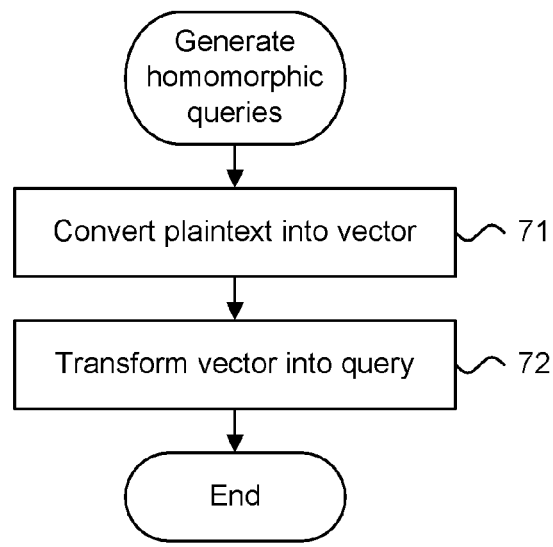
FIG. 6 is a flow diagram illustrating a routine for generating homomorphic queries for the method of FIG. 5 in accordance with one embodiment.

As described above, the homomorphic queries are cryptographically safe representations of plaintext data items. FIG. 6 is a flow diagram illustrating a routine 70 for generating homomorphic queries for the method 60 of FIG. 5 in accordance with one embodiment. First, a plaintext data items is converted into a vector using a cryptographically secure one-way compression function, which can be a Merkle-Damgård construction, and a semantic key described above with reference to FIG. 4 (step 71). The vector is further encrypted by a length-preserving encryption algorithm using the closure key described above with reference to FIG. 4 to generate a homomorphic query (step 72), terminating the routine 70.

Figure 7:
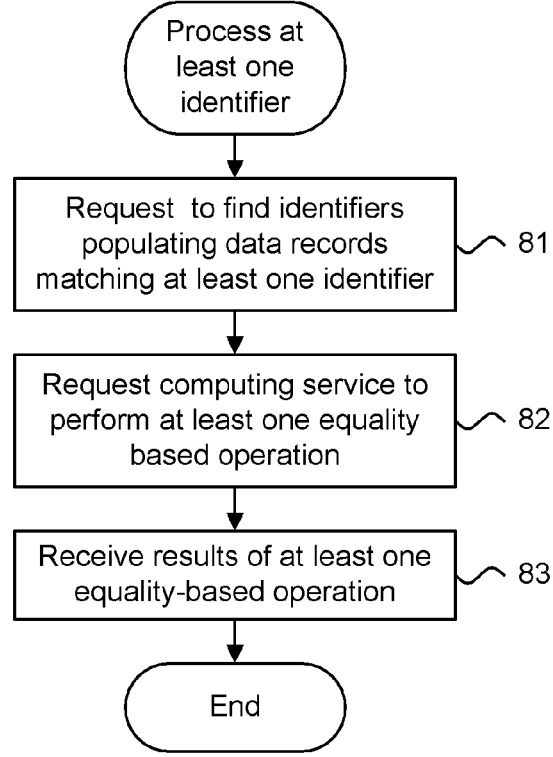
FIG. 7 is a flow diagram illustrating a routine for processing at least one identifier for the method of FIG. 5 in accordance with one embodiment.

Processing Ids corresponding to homomorphic queries allows processing data in a cloud computing environment while maintaining the encryption of the data. In a further embodiment, the operation can create new data structures and insert the identifiers into the new data structures. FIG. 7 is a flow diagram illustrating a routine 80 for processing at least one identifier for the method 60 of FIG. 5 in accordance with one embodiment. First, the client-side application requests the computing service to find, in the database accessible to the computing service and whose data structures include the Ids received from the application, the Ids matching a particular Id being processed (step 81). The computing service compares the at least one identifier to the identifiers in the data structures, and after the matching identifiers are found based on the comparison, the application requests the computing service to perform at least one equality-based operation on the matching identifiers, or on the data structures, in which one of the matching identifiers is present (step 82). As described above, the equality-based operations can vary depending on the type of data structure involve, and in one embodiment, can be hierarchy-based operations for hierarchy data structures and set operations for set data structures. Some of the equality-based operations involve processing more than one identifier. The hierarchy-based operations include enumerate, traverse, and count; the set operations query, enumerate, union, intersection, difference, subset and count. Other operations are possible. Depending on the operation used, the computing service can simply retrieve data structures that include one of the matching identifiers; retrieve the data structures and perform further processing on the data structures before the data structures are transmitted to the application as a result of the operation; and provide a statistic regarding the identifiers in the data structures, such as how many matching identifiers are in the data structures when the count operation is performed. The results of at least one of the equality-based operations performed are received by the client application, terminating the routine 80. Multiple identifiers can be processed using the routine 80.

Figure 8:
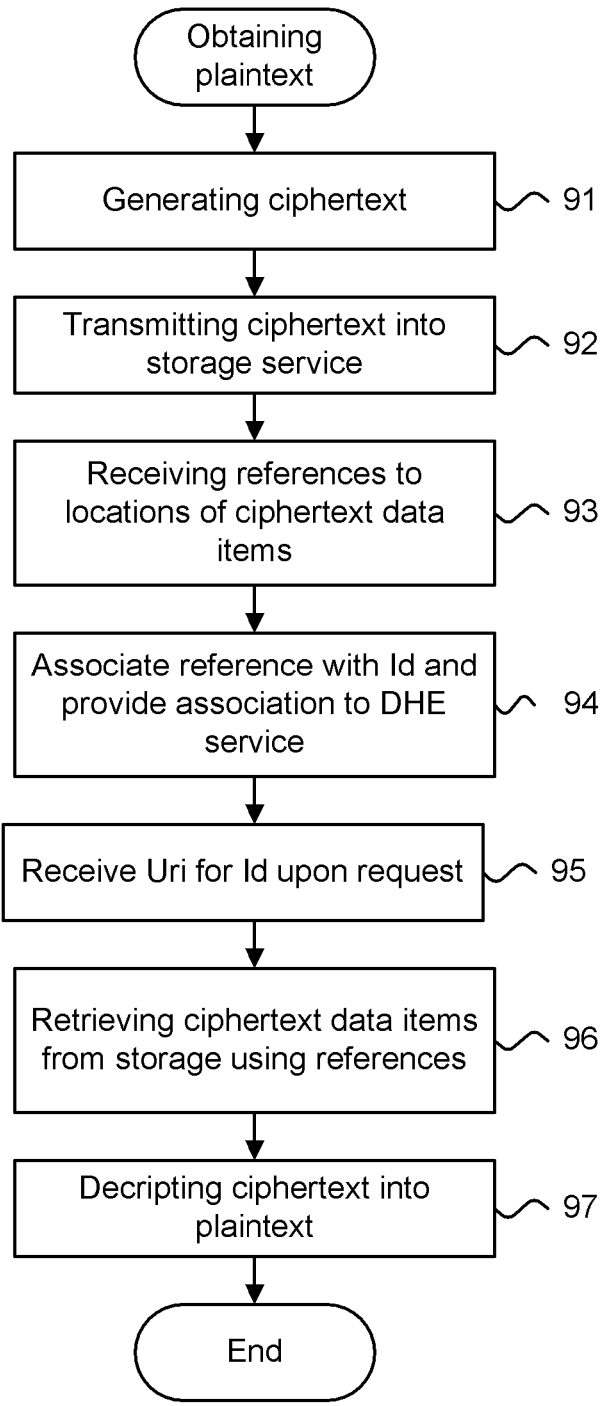
FIG. 8 is a flow diagram illustrating a routine for obtaining plaintext data items from which queries associated with at least one of identifiers received from the computing service were generated.

Once either the data structures or the statistic regarding the matching Id are received, the client application can obtain plaintext for either at least some of the identifiers in the returned data structures, or the Ids regarding which the statistic is received. FIG. 8 is a flow diagram illustrating a routine 90 for the method 50 of FIG. 5 for obtaining plaintext data items from which queries associated with at least one of identifiers received from the computing service were generated. Initially, the client application API converts the same plaintext data items that were used to generate the homomorphic queries into ciphertext data items (step 91). The client application transmits the ciphertext data items into the storage service (step 92). After the storage service stores the ciphertext data items into a location in the cloud-computing storage, the client application receives a Uri, a reference, to the location from the storage service (step 93).

The application associates the Uri with an Id identifying a query generated from the same plaintext data item as the ciphertext data item stored at the location identified by the Uri, and provides the association to the DHE service (step 94). Upon request, the application receives the Uri for a particular Id from the client (step 95). This step can be used to retrieve the Uri for Ids included in the results of the equality-based operation described above (step 95). The application then retrieves the ciphertext data item stored at the location by requesting the data item from the storage service (step 96). Upon receiving the data item, still encrypted as ciphertext, the application decrypts the data item into plaintext by performing a decryption algorithm (step 97), terminating the routine 90. Thus, the client application can process data items in the cloud without the data items being decrypted for the processing.

Examples of Certain Embodiments of the System and Method

The following examples are presented for the purposes of illustration and not limitation.

Customer Management System in the Cloud

Table 2 presents various structures typical for several records that can be used in one embodiment of the described system and method. Left side is the name of the record name; the right side is the fields of the record.

TABLE 2

| Record | Fields | Structure | Parent |
|---|---|---|---|
| Customer | Account Number (Cid), First Name, Last Name Address, City, State, Zip, Country | database row | n/a |
| Product | ProductId (Pid), Name, Price, Quantity, Description, Date | row | n/a |
| Order | OrderId (Oid), Cid, Date | Row | Customer |
| OrderDetail | DetailId (Did), Oid, Pid, Price, Quantity | Row | Order |

The client application ensures that all sensitive fields is substituted by with the DHE Ids, and thus enabling encrypted queries (in pseudo-SQL code below) based on equality-based operations on the DHE Ids.

a. Get all customers from "Seattle":
  Unencrypted: select * from Customers where City='Seattle'
  Encrypted: $Id_1$=Query("Seattle")
    select * from Customers where City=$Id_1$ b. Get all orders for customer "John Smith":
  Unencrypted: select Cid from Customers where First Name='John' and Last Name='Smith'
    Select * from Orders where Cid=Cid
  Encrypted: $Id_1$=Query("John")
    $Id_2$=Query("Smith")
    select Cid from Customers where First Name=$Id_1$ and Last Name=$Id_2$
    Select * from Orders where Cid=Cid c. Get a count of all orders for product "P":
  Unencrypted: select Pid from Products where Name=
    Select count(*) from OrderDetails where Pid=Pid
  Encrypted: $Id_1$=Query("P")
    select Pid from Products where Name=$Id_1$
    Select count(*) from OrderDetails where Pid=Pid Sharing of a Document Using the DHE service, a user ($U_1$) can share a document (D) with another user ($U_2$). The document typically consists of fields (F) of metadata: Name, Extension, Created, Modified and the data populating the fields. Other types of documents are possible.

When the user ($U_1$) stores the document in the computing service in the sharing-mode, each piece of information (F) (metadata and data) will be encrypted with a unique encryption key ($K_H$) and substituted with their corresponding DHE Id. Finally a document identifier ($D_1$) will be returned to the application 11.

The user ($U_2$) is given access to the document ($D_1$), so that user ($U_2$) can retrieve the composing fields as DHE Ids that can be further "decrypted" through the DHE service reverse queries in conjunction with their corresponding unique encryption key ($K_H$), as further described with reference to FIGS. 2 and 8.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for providing secure data processing in a cloud using discrete homomorphic encryption, comprising:
  a query module configured to homomorphically encrypt on a client computing device one or more plaintext data items into one or more homomorphic queries, each of the queries comprising a cryptographically safe representation of one of the encrypted data items;

a transmission module configured to transmit the queries to at least one discrete homomorphic encryption (DHE) server and to receive from the DHE server one or more identifiers, each of the identifiers associated with one of the queries;

a computing module configured to transmit the received identifiers to at least one computing server in a cloud-computing environment;

an encryption module configured to encrypt the one or more plaintext data items into ciphertext data items;

a transmission module configured to transmit the ciphertext data items to at least one storage server in the cloud-computing environment and to request the storage server to store the ciphertext data items in a storage in the cloud-computing environment;

a receipt module configured to receive from the storage server a reference for a location of each of the ciphertext data items in the storage;

an association module configured to create an association between each of the received references and the identifier associated with the query that was encrypted from the same plaintext data item as the ciphertext data item the location of which is identified by that reference;

a request module configured to request the computing server to process at least one of the transmitted identifiers and to receive a result of the processing comprising at least one of the transmitted identifiers;

a retrieval module configured to retrieve the ciphertext data item whose location is identified by the reference associated with the at least one identifier in the result; and a decryption module configured to decrypt the retrieved ciphertext data item into the corresponding plaintext data item.

2. A system according to claim 1, further comprising:
an insertion module configured to request the computing server to insert the received identifiers into a database maintained in the cloud-computing environment, comprising at least one of:
  a substitution module configured to request the computing server to substitute with the identifiers existing data in data structures comprised in the database; and
  a creation module configured to request the computing server to create one or more additional data structures in the database and to insert the identifiers into the additional data structures.

3. A system according to claim 2, wherein each of the data structures comprises a record, the identifiers are substituted into one or more searchable fields and one or more data fields comprised in one or more of the records, and wherein a search for one of the identifiers locates the record in which that identifier is comprised.

4. A system according to claim 1, further comprising:
an association transmission module configured to transmit to the DHE server one or more of the associations and one or more of the references;
a reference request module configured to request the reference associated with the one identifier comprised in the result from the DHE server; and
a reference receipt module configured to receive the associated reference from the DHE server.

5. A system according to claim 4, further comprising:
a key encryption module configured to encrypt an encryption key with a public key associated with a user different from a user associated with the client computing device and to transmit the encrypted key to the at least one DHE server;
an instruction module configured to instruct the at least one DHE server to provide the encrypted key and one or more of the references associated with one or more of the identifiers to a computing device associated with the different user upon request of the different user computing device,
wherein the different user computing device decrypts the encrypted key with a private key and uses the decrypted key and the provided references to obtain the plaintext data items associated with the identifiers associated with the selected references.

6. A system according to claim 1, further comprising:
a selection module configured to receive a user selection of one of the identifiers, wherein the selected identifier undergoes the processing.

7. A system according to claim 1, further comprising:
a sending module configured to send to the at least one DHE server a user name and a hashed password; and
a receipt module configured to receive from the DHE service a security token comprising a user id,
wherein all of the transmissions to the at least one DHE server are accompanied by the security token.

8. A system according to claim 1, further comprising:
a generation module configured to generate one or more encryption keys;
a transformation module configured to transform at least the one or more data items into vectors using a cryptographically secure one-way compression function;
an initialization module configured to transform the vectors into initialization vectors using a one-way compression function, wherein the initialization vectors are used to create the ciphertext data items; and
a vector module configured to transform the vectors into queries using a length-preserving encryption algorithm and one of the encryption keys.

9. A system according to claim 1, wherein the identifier for each query lacks a semantic relationship to that query.

10. A system according to claim 1, further comprising:
a population module configured to request the computing server to populate with the identifiers one or more data structures comprised in a database maintained in the cloud-computing environment; and
an operation module configured to request the computing server to perform one or more equality-based operations on at least one of the identifiers matching the identifier being processed and one or more of the data structures in which the matching identifiers are comprised.

11. A computer-implemented method for providing secure data processing in a cloud using discrete homomorphic encryption, comprising the steps of:
homomorphically encrypting on a client computing device one or more plaintext data items into one or more homomorphic queries, each of the queries comprising a cryptographically safe representation of one of the encrypted data items;
transmitting the queries to at least one discrete homomorphic encryption (DHE) server and receiving from the DHE server one or more identifiers, each of the identifiers associated with one of the queries;
transmitting the received identifiers to at least one computing server in a cloud-computing environment;
encrypting the one or more plaintext data items into ciphertext data items;

transmitting the ciphertext data items to at least one storage server in the cloud-computing environment and requesting the storage server to store the ciphertext data items in a storage in the cloud-computing environment;

receiving from the storage server a reference for a location of each of the ciphertext data items in the storage;

creating an association between each of the received references and the identifier associated with the query that was encrypted from the same plaintext data item as the ciphertext data item the location of which is identified by that reference;

requesting the computing server to process at least one of the transmitted identifiers and receiving a result of the processing comprising at least one of the transmitted identifiers;

retrieving the ciphertext data item whose location is identified by the reference associated with the at least one identifier in the result; and decrypting the retrieved ciphertext data item into the corresponding plaintext data item.

12. A method according to claim 11, further comprising:
requesting the computing server to insert the received identifiers into a database maintained in the cloud-computing environment, comprising at least one of:
   requesting the computing server to substitute with the identifiers existing data in data structures comprised in the database; and
   requesting the computing server to create one or more additional data structures in the database and inserting the identifiers into the additional data structures.

13. A method according to claim 12, wherein each of the data structures comprises a record, the identifiers are substituted into one or more searchable fields and one or more data fields comprised in one or more of the records, and wherein a search for one of the identifiers locates the record in which that identifier is comprised.

14. A method according to claim 11, further comprising:
transmitting to the DHE server one or more of the associations and one or more of the references;
requesting the reference associated with the one identifier comprised in the result from the DHE server; and
receiving the associated reference from the DHE server.

15. A method according to claim 14, further comprising:
encrypting an encryption key with a public key associated with a user different from a user associated with the client computing device and transmitting the encrypted key to the at least one DHE server;
instructing the at least one DHE server to provide the encrypted key and one or more of the references associated with one or more of the identifiers to a computing device associated with the different user upon request of the different user computing device,
wherein the different user computing device decrypts the encrypted key with a private key and uses the decrypted key and the provided references to obtain the plaintext data items associated with the identifiers associated with the selected references.

16. A method according to claim 11, further comprising:
receiving a user selection of one of the identifiers, wherein the selected identifier undergoes the processing.

17. A method according to claim 11, further comprising:
sending to the at least one DHE server a user name and a hashed password; and
receiving from the DHE service a security token comprising a user id,
wherein all of the transmissions to the at least one DHE server are accompanied by the security token.

18. A method according to claim 11, further comprising:
generating one or more encryption keys;
transforming at least the one or more data items into vectors using a cryptographically secure one-way compression function;
transforming the vectors into initialization vectors using a one-way compression function, wherein the initialization vectors are used to create the ciphertext data items; and
transforming the vectors into queries using a length-preserving encryption algorithm and one of the encryption keys.

19. A method according to claim 11, wherein the identifier for each query lacks a semantic relationship to that query.

20. A method according to claim 11, further comprising:
requesting the computing server to populate with the identifiers one or more data structures comprised in a database maintained in the cloud-computing environment; and
requesting the computing server to perform one or more equality-based operations on at least one of the identifiers matching the identifier being processed and one or more of the data structures in which the matching identifiers are comprised.

* * * * *